United States Patent
Stanhope (10) Patent No.: US 11,602,093 B2
(45) Date of Patent: Mar. 14, 2023

(54) SYSTEM AND METHOD FOR CONTROLLING THE OPERATION OF A SEED-PLANTING IMPLEMENT BASED ON TOPOGRAPHICAL FEATURES PRESENT WITHIN A FIELD

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 706 days.

(21) Appl. No.: 16/437,555

(22) Filed: Jun. 11, 2019

(65) Prior Publication Data
US 2020/0390022 A1 Dec. 17, 2020

(51) Int. Cl.
*A01B 63/24* (2006.01)
*A01B 79/00* (2006.01)
(Continued)

(52) U.S. Cl.
CPC .......... *A01B 63/245* (2013.01); *A01B 63/004* (2013.01); *A01B 79/005* (2013.01);
(Continued)

(58) Field of Classification Search
CPC ................ A01B 63/245; A01B 63/004; A01B 79/005; A01C 5/062; A01C 7/08; G01S 17/89
See application file for complete search history.

(56) References Cited

U.S. PATENT DOCUMENTS

| 6,819,780 B2 | 11/2004 | Benson et al. |
| 8,725,361 B2 | 5/2014 | Kellum |

(Continued)

FOREIGN PATENT DOCUMENTS

EP    3127782    2/2017

OTHER PUBLICATIONS

Yun, Changho, et al., "Stereovision-Based Guidance Line Detection Method for Auto-Guidance System on Furrow Irrigated Fields," IFAC-Papers OnLine, vol. 51, Issue 17, 2018, pp. 157-161.
(Continued)

*Primary Examiner* — Tara Mayo-Pinnock
(74) *Attorney, Agent, or Firm* — Rebecca Henkel; Rickard DeMille (57) ABSTRACT

In one aspect, a system for controlling the operation of a seed-planting implement may include a furrow-forming tool configured to form a furrow in soil present within a field. Furthermore, the system may include a sensor configured to capture data indicative of a topographical profile of the soil within the field. Additionally, a controller of the disclosed system may be configured to identify a topographical feature within the field based on the data received from the sensor. Furthermore, the controller may be configured to determine a position of the furrow-forming tool relative to the identified topographical feature. Additionally, the controller may be configured to initiate a control action to adjust the position of the furrow-forming tool when it is determined that the relative position between the furrow-forming tool and the identified topographical feature is offset from a predetermined positional relationship defined for the furrow-forming tool.

16 Claims, 7 Drawing Sheets

(51) Int. Cl.
  *A01C 5/06*   (2006.01)
  *G01B 11/24*  (2006.01)
  *G01S 17/89*  (2020.01)
  *A01B 63/00*  (2006.01)
  *A01C 7/08*   (2006.01)

(52) U.S. Cl.
  CPC .............. *A01C 5/062* (2013.01); *A01C 5/064* (2013.01); *G01B 11/24* (2013.01); *G01S 17/89* (2013.01); *A01C 7/08* (2013.01)

(56) References Cited

U.S. PATENT DOCUMENTS

| | | | |
|---|---|---|---|
| 9,389,615 | B2 | 7/2016 | Webber et al. |
| 9,766,083 | B2 | 9/2017 | Peake et al. |
| 10,031,525 | B2 | 7/2018 | Dix et al. |
| 10,104,827 | B2 | 10/2018 | Adamchuk et al. |
| 10,162,354 | B2 | 12/2018 | Kong et al. |
| 2002/0106108 | A1* | 8/2002 | Benson et al. ......... G01C 11/00 382/104 |
| 2009/0037059 | A1 | 2/2009 | Huster et al. |
| 2011/0232554 | A1* | 9/2011 | Garner et al. ........... A01C 7/04 111/184 |
| 2013/0191017 | A1* | 7/2013 | Peake et al. ......... G05D 1/0227 701/410 |
| 2013/0269578 | A1* | 10/2013 | Grimm et al. ....... A01C 23/007 111/127 |
| 2014/0324272 | A1 | 10/2014 | Madsen et al. |
| 2017/0010619 | A1 | 1/2017 | Foster et al. |
| 2017/0357262 | A1* | 12/2017 | Dix et al. ................ G01S 19/13 |
| 2018/0325012 | A1 | 11/2018 | Ferrari et al. |
| 2018/0373259 | A1 | 12/2018 | Aberle et al. |

OTHER PUBLICATIONS

Tillet, N.D., "Automatic Guidance Sensors for Agricultural Field Machines: A Review," Journal of Agricultural Engineering Research, vol. 50, Sep.-Dec. 1991, pp. 167-187.

* cited by examiner

SYSTEM AND METHOD FOR CONTROLLING THE OPERATION OF A SEED-PLANTING IMPLEMENT BASED ON TOPOGRAPHICAL FEATURES PRESENT WITHIN A FIELD

FIELD OF THE INVENTION

The present disclosure generally relates to seed-planting implements and, more particularly, to systems and methods for controlling the operation of a seed-planting implement based on the relative positioning between the implement and one or more topographical features present within a field across which the implement is being moved.

BACKGROUND OF THE INVENTION

Modern farming practices strive to increase yields of agricultural fields. In this respect, seed-planting implements are towed behind a tractor or other work vehicle to disperse seed throughout a field. For example, as a seed-planting implement is moved across the field, one or more furrow-forming tools (e.g., one or more disc openers) of the implement may form a furrow or trench in the soil. One or more dispensing devices may, in turn, deposit the seeds into the furrow. After deposition of the seeds, a furrow-closing assembly may close the furrow in the soil, and a packer wheel may pack the soil on top of the deposited seeds.

Ridge planting is a field management technique in which crops are planted into seedbed ridges formed in the field during tillage. The soil present within the ridges generally warms up and dries out earlier in the season, thereby allowing earlier planting of crops. Furthermore, certain types of crops (e.g., potatoes, carrots, sugar beets, and/or the like) experience improved agronomic performance when grown in a ridge planting scheme due to the increased volume of warmer and drier soil in contact with their roots. However, it is difficult for an operator to maintain the position of a seed-planting implement within the field during a seed-planting operation such that the furrow-forming tool(s) is aligned with a seedbed ridge.

Accordingly, an improved system and method for controlling the operating of a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of a seed-planting implement. The system may include a furrow-forming tool configured to form a furrow in soil present within a field across which the seed-planting implement is being moved. Furthermore, the system may include a sensor configured to capture data indicative of a topographical profile of the soil within the field. Additionally, the system may include a controller communicatively coupled to the sensor. The controller may be configured to identify a topographical feature within the field based on the data received from the sensor. Furthermore, the controller may be configured to determine a position of the furrow-forming tool relative to the identified topographical feature. Additionally, the controller may be configured to initiate a control action to adjust the position of the furrow-forming tool when it is determined that the relative position between the furrow-forming tool and the identified topographical feature is offset from a predetermined positional relationship defined for the furrow-forming tool.

In another aspect, the present subject matter is directed to a method for controlling the operation of a seed-planting implement. The seed-planting implement may include a furrow-forming tool configured to form a furrow in soil present within a field across which the seed-planting implement is being moved. The method may include identifying, with one or more computing devices, a topographical feature within the field based on received sensor data. Furthermore, the system may include determining, with the one or more computing devices, a position of the furrow-forming tool relative to the identified topographical feature. Additionally, when the relative position between the furrow-forming tool and the identified topographical feature is offset from a predetermined positional relationship defined for the furrow-forming tool, the method may include initiating, with the one or more computing devices, a control action to adjust the position of the furrow-forming tool.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of a seed-planting implement. Specifically, in several embodiments, a controller of the disclosed system may be configured to identify one or more topographical features within the field, such as a seedbed ridge(s), based on data received from one or more field topography sensors (e.g., a light detection and ranging (LIDAR) sensor(s) and/or a camera(s)). Thereafter, the controller may be configured to determine the position(s) of one or more furrow-forming tools (e.g., one or more disc openers) of the seed-planting implement relative to the identified topographical feature(s). For instance, in one embodiment, the controller may be configured to determine the lateral distance(s) defined between the furrow-forming tool(s) and the topographical feature(s) in a lateral direction (i.e., the direction extending perpendicular to a direction of travel of the seed-planting implement). When the relative positioning between the furrow-forming tool(s) and the identified topographical feature(s) is offset from a predetermined positional relationship, the controller may be configured to initiate one or more control actions to adjust the position of the tool(s). For instance, when the lateral distance(s) defined between the furrow-forming tool(s) and the topographical feature(s) exceeds a maximum lateral distance, the controller may be configured to initiate an adjustment of the orientation or direction of travel of the implement to reduce the lateral distance defined between the tool(s) and the identified feature(s).

Figure 1:
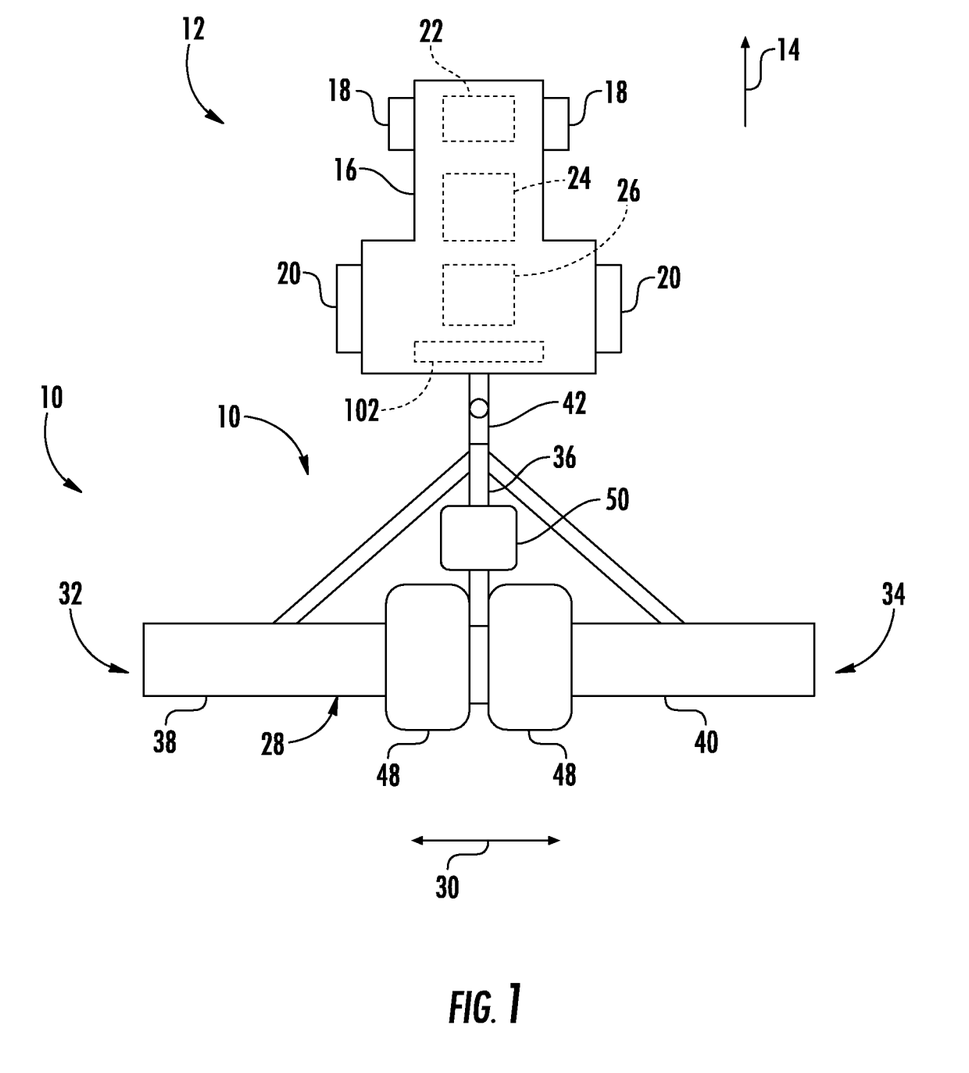
FIG. 1 illustrates a top view of one embodiment of a seed-planting implement coupled to a work vehicle in accordance with aspects of the present subject matter.
Figure 2:
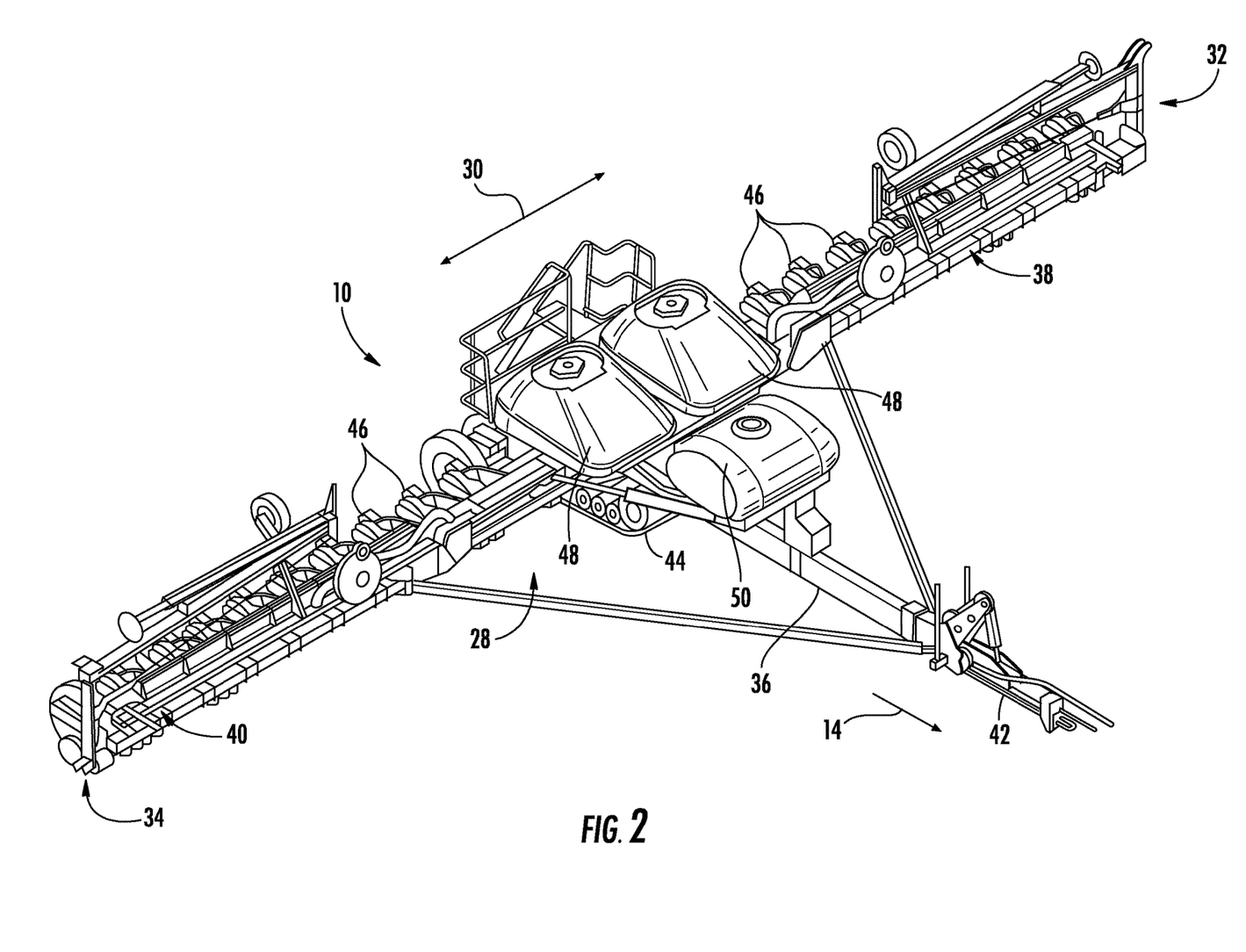
FIG. 2 illustrates a perspective view of the seed-planting implement shown in FIG. 1, particularly illustrating various components of the implement.

Referring now to the drawings, FIGS. 1 and 2 illustrate differing views of one embodiment of a seed-planting implement 10 in accordance with aspects of the present subject matter. Specifically, FIG. 1 illustrates a top view of the implement 10 coupled to a work vehicle 12. Additionally, FIG. 2 illustrates a perspective view of the implement 10, particularly illustrating various components of the implement 10.

In general, the vehicle 12 may be configured to tow the implement 10 across a field in a direction of travel (e.g., as indicated by arrow 14 in FIG. 1). As shown, in the illustrated embodiment, the implement 10 is configured as a seeder (e.g., a disc drill), and the vehicle 12 is configured as an agricultural tractor. However, in alternative embodiments, the implement 10 may be configured as any other suitable type of seed-planting implement, such as a planter or another seed-dispensing implement, a side dresser or another fertilizer-dispensing implement, a strip tiller, and/or the like. Similarly, the vehicle 12 may be configured as any other suitable type of vehicle, such as an agricultural harvester, a self-propelled sprayer, and/or the like.

As shown in FIG. 1, the vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the vehicle 12 relative to the ground and move the vehicle 12 in the direction of travel 14 across the field. Moreover, the vehicle 12 may include a vehicle steering actuator 22 configured to adjust the orientation of the steerable wheels 18 relative to the frame 12. For example, the vehicle steering actuator 22 may correspond to an electric motor, a linear actuator, a hydraulic cylinder, a pneumatic cylinder, or any other suitable actuator coupled to suitable mechanical assembly, such as a rack and pinion or a worm gear assembly. However, in alternative embodiments, the front wheels 18 may be driven in addition to or in lieu of the rear wheels 20 and/or the rear wheels may be steerable in addition to or in lieu of the front wheels 18. Additionally, in further embodiments, the vehicle 12 may include track assemblies (not shown) in place of the front and/or rear wheels 18, 20.

Furthermore, the vehicle 12 may include one or more devices for adjusting the speed at which the vehicle 12 moves across the field in the direction of travel 14. Specifically, in several embodiments, the vehicle 12 may include an engine 24 and a transmission 26 mounted on the frame 16. In general, the engine 24 may be configured to generate power by combusting or otherwise burning a mixture of air and fuel. The transmission 26 may, in turn, be operably coupled to the engine 24 and may provide variably adjusted gear ratios for transferring the power generated by the engine 24 to the driven wheels 20. For example, increasing the power output by the engine 24 (e.g., by increasing the fuel flow to the engine 24) and/or shifting the transmission 26 into a higher gear may increase the speed at which the vehicle 12 moves across the field. Conversely, decreasing the power output by the engine 24 (e.g., by decreasing the fuel flow to the engine 26) and/or shifting the transmission 26 into a lower gear may decrease the speed at which the vehicle 12 moves across the field.

Moreover, a location sensor 102 may be provided in operative association with the implement 10 and/or the vehicle 12. For instance, in the embodiment shown in FIG. 1, the location sensor 102 is installed on or within the vehicle 12. However, in other embodiments, the location sensor 102 may be installed on or within the implement 10. In general, the location sensor 102 may be configured to determine the location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 102 may be used to geo-locate the implement 10 within the field.

Referring still to FIGS. 1 and 2, the implement 10 may include a frame or toolbar 28 configured to support and/or couple to one or more components of the implement 10. Specifically, in several embodiments, the toolbar 28 may extend along a lateral direction 30 between a first side 32 of the implement 10 and a second side 34 of the implement 10. As shown, the toolbar 28 may include a center section 36 and a pair of wing sections 38, 40. In one embodiment, the wing sections 38, 40 may be pivotably coupled to the center section 36 in a manner that permits the wing sections 38, 40 to fold forward to reduce the lateral width of the implement 10, such as during storage or transportation of the implement 10 on a road. Furthermore, a tow bar 42 may be coupled to the center section 36 to allow the implement 10 to be towed by the vehicle 12. As will be described below, in one embodiment, the implement 10 may also include a track assembly 44 to support the toolbar 28 relative to the ground.

Additionally, as shown in FIG. 2, the wing sections 38, 40 may generally be configured to support a plurality of row units (or seed-planting units) 46. Each row unit 46 may, in turn, be configured to deposit seeds at a desired depth beneath the soil surface and at a desired seed spacing as the implement 10 is being towed by the vehicle 12, thereby establishing rows of planted seeds. In some embodiments, the bulk of the seeds to be planted may be stored in one or more hoppers or seed tanks 48 mounted on or otherwise supported by the toolbar 28. Thus, as seeds are planted by the row units 46, a pneumatic distribution system (not shown) may distribute additional seeds from the seed tanks 48 to the individual row units 46. Additionally, one or more fluid tanks 50 mounted on or otherwise supported by the toolbar 28 may store agricultural fluids, such as insecticides, herbicides, fungicides, fertilizers, and/or the like, which may be sprayed onto the seeds during planting.

It should be appreciated that, for purposes of illustration, only a portion of the row units 46 of the implement 10 have been shown in FIG. 2. In general, the implement 10 may include any number of row units 44, such as six, eight, twelve, sixteen, twenty-four, thirty-two, or thirty-six row units. In addition, it should be appreciated that the lateral spacing between row units 46 may be selected based on the type of crop being planted. For example, the row units 46 may be spaced approximately thirty-six inches from one another for planting cotton, and approximately fifteen inches from one another for planting soybeans.

Figure 3:
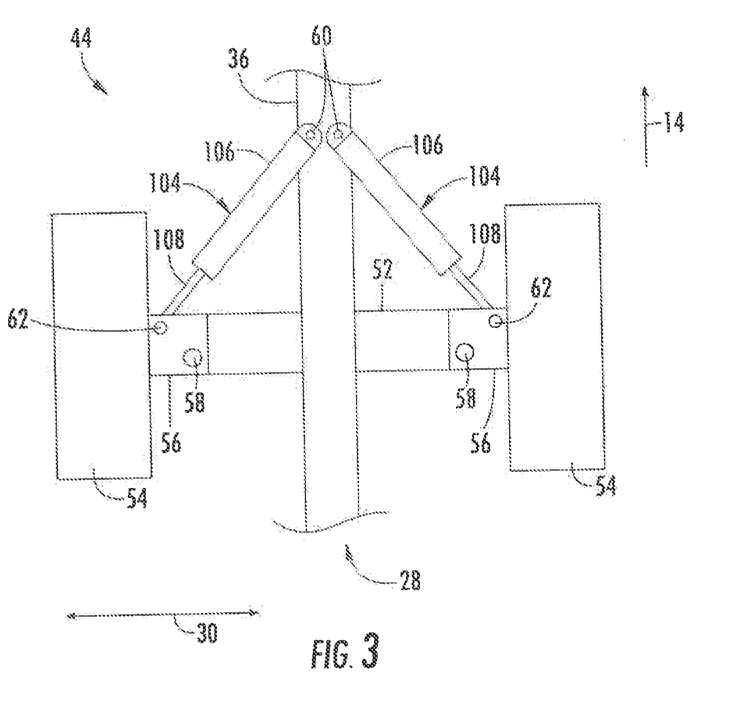
FIG. 3 illustrates a top view of one embodiment of a track assembly of a seed-planting implement in accordance with aspects of the present subject matter.

Referring now to FIG. 3, a top view of one embodiment of a track assembly 44 is illustrated in accordance with aspects of the present subject matter. As shown, the track assembly 44 may include an axle 52 coupled to the center section 36 of the toolbar 28. The track assembly 44 may also include a pair of tracks 54 that are pivotably coupled to the axle 52. For example, in one embodiment, each track 54 may be coupled to a corresponding knuckle 56, with each knuckle 56 being pivotably coupled to the axle 52 at a pivot joint 58. As such, the pivot joints 58 may permit the tracks 54 to pivot or otherwise move relative to the axle 52 in a manner that adjusts the direction of travel 14 of the implement 10 (e.g., the direction of travel or orientation of the tracks 54). However, it should be appreciated that, in alternative embodiments, the tracks 54 of the track assembly 44 may be movably coupled to the toolbar 28 in any other suitable manner that permits the direction of travel 14 of the implement 10 to be adjusted. Furthermore, it should be appreciated that the implement 10 may include other components configured to adjust the direction of travel 14. For example, the implement 10 may include one or more steerable wheels or coulters (not shown) that are configured to adjust the direction of travel 14 of the implement 10.

Moreover, the track assembly 44 may include a pair of implement steering actuators 104 configured to move the tracks 54 relative to the toolbar 28. As shown, in several embodiments, a cylinder 106 of each actuator 104 may be pivotably coupled to the center section 36 of the toolbar 28 at pivot joints 60, while a rod 108 of each actuator 104 may be pivotably coupled to one of the knuckles 56 at a corresponding pivot joint 62. In this regard, the rods 106 of the actuators 104 may be configured to extend and/or retract relative to the cylinder 108 of the corresponding actuator 104 to adjust the orientation the tracks 54 relative to the center section 36 of the toolbar 28, which, in turn, adjusts the direction of travel 14 of the implement 10. In the illustrated embodiment, the actuators 104 correspond to fluid-driven actuators, such as hydraulic or pneumatic cylinders. However, it should be appreciated that the actuators 104 may correspond to any other suitable type of actuator, such as electric linear actuators. Furthermore, it should be appreciated that the implement 10 may include any other suitable number of actuators 104 configured to adjust the position of the tracks 54 relative to the toolbar 28, such as a single actuator 104 or three or more actuators 104.

Figure 4:
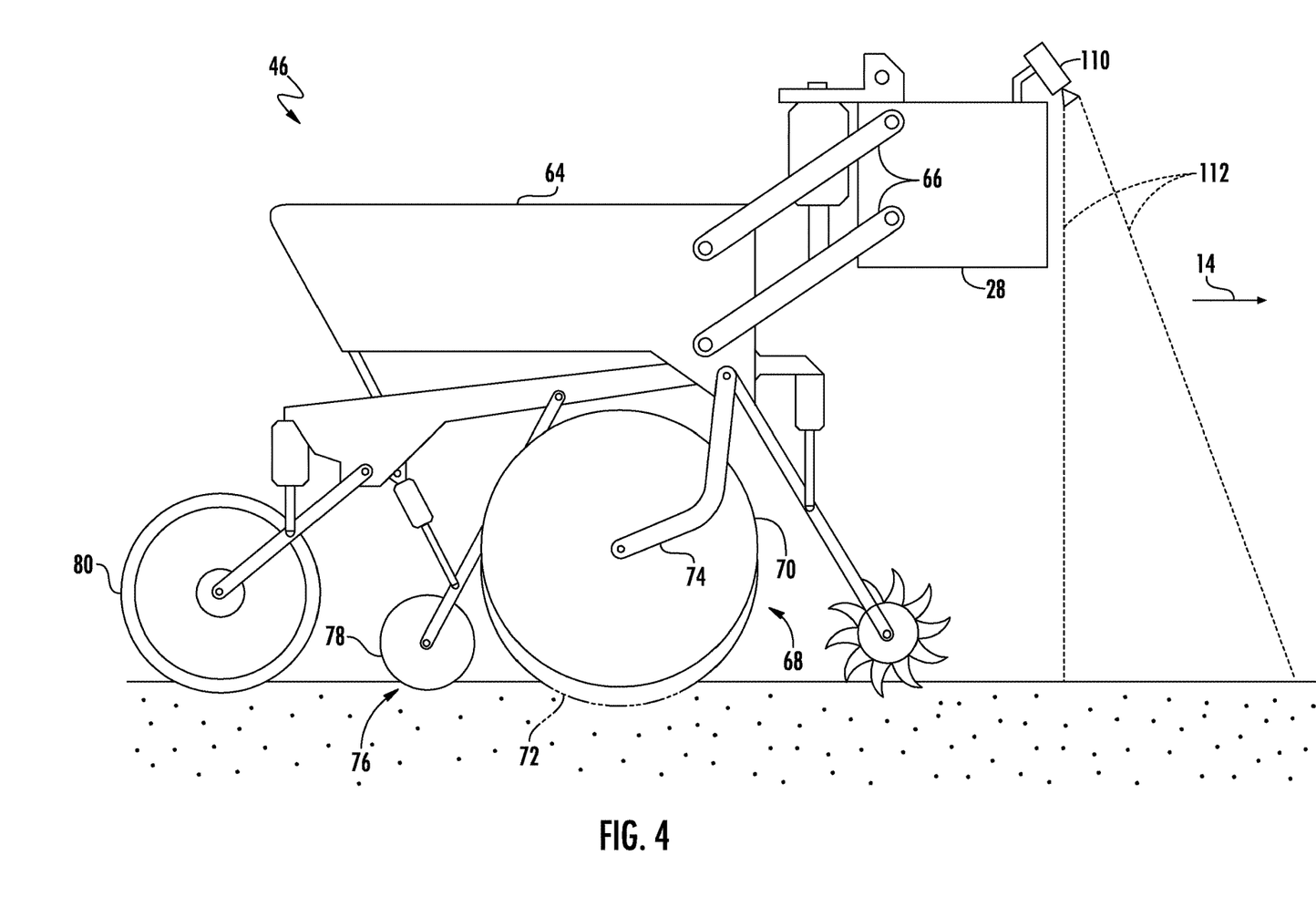
FIG. 4 illustrates a side view of one embodiment of a row unit of a seed-planting implement in accordance with aspects of the present subject matter.

Referring now to FIG. 4, a side view of one embodiment of a row unit 46 is illustrated in accordance with aspects of the present subject matter. As shown, the row unit 46 may include a frame 64 adjustably coupled to the toolbar 28 by links 66. For example, one end of each link 66 may be pivotably coupled to the frame 64, while an opposed end of each link 66 may be pivotably coupled to the toolbar 28. In one embodiment, the links 66 may be parallel. However, in alternative embodiments, the row unit 46 may be coupled to the toolbar 28 in any other suitable manner.

As shown in FIG. 4, the row unit 46 may include a furrow-opening assembly 68. For example, in one embodiment, the furrow-opening assembly 68 may include a gauge wheel 70 and one or more disc openers 72 configured to excavate a furrow or trench in the soil. In general, the gauge wheel 70 may be configured to engage the top surface of the soil as the implement 10 is moved across the field. As such, the height of the disc opener(s) 72 may adjusted with respect to the position of the gauge wheel 70 to set the desired depth of the furrow being excavated. Furthermore, the furrow-opening assembly 68 may include a support arm 74 configured to adjustably couple the gauge wheel 70 to the frame 64. For example, one end of the support arm 74 may be pivotably coupled to the gauge wheel 70, while an opposed end of the support arm 74 may be pivotably coupled to the frame 64. Additionally, the disc opener(s) 72 may be coupled (e.g., bolted) to the frame 54. However, in alternative embodiments, the gauge wheel 70 and the disc opener(s) 72 may be coupled to the frame 64 in any other suitable manner. Furthermore, the furrow-opening assembly 68 may include any other suitable type of furrow-forming tool, such as a hoe(s).

Moreover, as shown, the row unit 46 may include a furrow-closing assembly 76. Specifically, in several embodiments, the furrow closing assembly 76 may include a pair of closing discs 78 (only one of which is shown) positioned relative to each other in a manner that permits soil to flow between the discs 78 as the implement 10 is moved across the field. In this regard, the closing discs 78 may be configured to close the furrow after seeds have been deposited therein, such as by collapsing the excavated soil into the furrow. Furthermore, in alternative embodiments, the furrow closing assembly 76 may include any other suitable number of closing discs 78, such as one closing disc 78 or three or more closing discs 78. Additionally, the row unit 46 may include a press wheel 80 configured to roll over the closed furrow to firm the soil over the seed and promote favorable seed-to-soil contact.

It should be further appreciated that the configuration of the seed-planting implement 10 and the work vehicle 12 described above and shown in FIGS. 1-4 is provided only to place the present subject matter in an exemplary field of use. Thus, it should be appreciated that the present subject matter may be readily adaptable to any manner of implement and/or vehicle configuration.

In accordance with aspects of the present subject matter, the seed-planting implement 10 and/or the work vehicle 12 may include one or more field topography sensors 110 coupled thereto and/or supported thereon for detecting the topography of the field across which the implement/vehicle 10/12 is traveling. Specifically, in several embodiments, the field topography sensor(s) 110 may be provided in operative association with the implement 10 and/or the vehicle 12 such that the sensor(s) 110 has a field of view or sensor detection range directed towards a portion(s) of the field forward and/or aft of the implement 10 and/or the vehicle 12. In this regard, the field topography sensor(s) 110 may be used to detect the topography of the field as the implement/vehicle 10/12 travels across the field during the performance of a seed-planting operation. As will be described below, by analyzing the field topography data captured by the field topography sensor(s) 110, an associated controller may then be configured to identify the position(s) of a topographical feature(s) (e.g., a seedbed ridge(s)) present within the field. Based on the identified position(s) of the topographical feature(s), the controller may, for example, control/adjust the operation of the implement 10 and/or the vehicle 12, as necessary, to ensure that the relative positioning between a furrow-forming tool(s) (e.g., a disc opener(s) 72) of the implement 10 and the identified topographical feature(s) is maintained within a predetermined positional relationship.

In general, the field topography sensor(s) 110 may correspond to any suitable sensing device(s) configured to detect or capture data indicative of the topography of the field. In several embodiments, the field topography sensor(s) 110 may correspond to a non-contact-based sensor(s). For instance, in one embodiment, the field topography sensor(s) 110 may correspond to a Light Detection and Ranging ("LIDAR") device(s), such as a LIDAR scanner(s). In such an embodiment, the field topography sensor(s) 110 may be configured to output light pulses from a light source (e.g., a laser outputting a pulsed laser beam) and detect the reflection of each pulse off of the soil surface. Based on the time of flight of the light pulses, the specific location (e.g., 3-D coordinates) of the soil surface relative to the sensor(s) 110 may be calculated. By scanning the pulsed light over a given swath width, the topography of the field may be detected across a given section of the field. Thus, by continuously scanning the pulsed light along the soil surface as the implement 10 and the vehicle 12 travel across the field, a point cloud may be generated that includes topography data for all or a portion of the field.

In another embodiment, the field topography sensor(s) 110 may correspond to a suitable camera(s) configured to capture three-dimensional images of the soil surface, thereby allowing the field topography to be calculated or estimated by analyzing the content of each image. For instance, in a particular embodiment, the field topography sensor(s) 110 may correspond to a stereographic camera(s) having two or more lenses with a separate image sensor for each lens to allow the camera(s) to capture stereographic or three-dimensional images. In a further embodiment, the field topography sensor(s) 110 may correspond to any other suitable sensing device(s) configured to detect or capture field topography data, such as an acoustic sensor(s) or an electromagnetic sensor(s). For instance, the field topography sensor(s) 110 may correspond to an ultrasound device(s) configured to emit ultrasound waves and detect the reflection of such waves off of the soil surface to allow the field topography to be estimated. Alternatively, the field topography sensor(s) 110 may correspond to a radar device(s) configured to emit radar waves and detect the reflection of such waves off of the soil surface to allow the field topography to be estimated.

It should be appreciated that the field topography sensor(s) 110 may be mounted on or otherwise installed on the implement 10, the row unit(s) 46, and/or the vehicle 12 at any suitable location(s). For example, as shown in FIG. 4, in one embodiment, a field topography sensor 110 may be installed on the toolbar 28 of the implement 10 such that the sensor 110 has a field of view (e.g., as indicated by dashed lines 112 in FIG. 4) directed towards a portion of the field forward of the furrow-forming tool(s) (e.g., the disc opener(s) 72) of the implement 10 relative to the direction of travel 14. As such, the field topography sensor 110 may be configured to capture data indicative of the topography of the field forward of the implement 10. However, in another embodiment, the field topography sensor 110 may be installed on the toolbar 28 such that its field of view 112 is directed towards a portion of the field aft of the implement 10. In such an embodiment, the field topography sensor 110 may be configured to capture data indicative of the topography of the field forward or aft of the implement 10. In a further embodiment, a field topography sensor 110 may be installed on the vehicle 12 (e.g., in addition to or as an alternative to the implement 10) such that its field of view 112 is directed towards a portion of the field forward or aft of the vehicle 12. Moreover, it should be appreciated that, although FIG. 4 illustrates one field topography sensor 110 installed on the implement 10, any other suitable number of sensors 110 may be installed the implement 10 and/or vehicle 12, such as two or more sensors 110.

Figure 5:
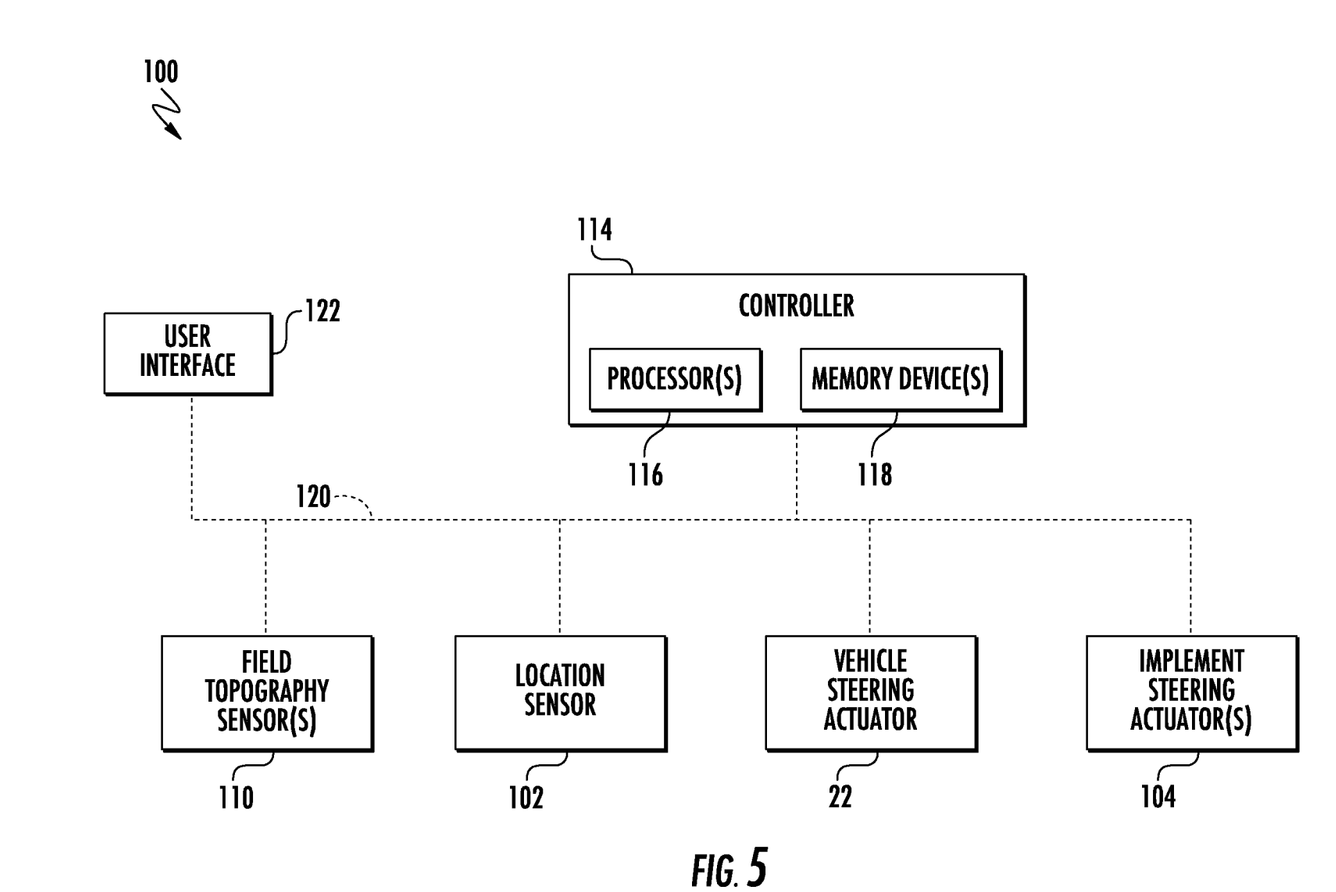
FIG. 5 illustrates a schematic view of one embodiment of a system for controlling the operation of a seed-planting implement in accordance with aspects of the present subject matter.

Referring now to FIG. 5, a schematic view of one embodiment of a system 100 for controlling the operation of a seed-planting implement is illustrated in accordance with aspects of the present subject matter. In general, the system 100 will be described herein with reference to the seed-planting implement 10 and the work vehicle 12 described above with reference to FIGS. 1-4. However, it should be appreciated by those of ordinary skill in the art that the disclosed system 100 may generally be utilized with seed-planting implements having any other suitable implement configuration and/or work vehicles having any other suitable vehicle configuration.

As shown in FIG. 5, the system 100 may include a controller 114 positioned on and/or within or otherwise associated with the implement 10 or the vehicle 12. In general, the controller 114 may comprise any suitable processor-based device known in the art, such as a computing device or any suitable combination of computing devices. Thus, in several embodiments, the controller 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the controller 114 to perform various computer-implemented functions.

In addition, the controller 114 may also include various other suitable components, such as a communications circuit or module, a network interface, one or more input/output channels, a data/control bus and/or the like, to allow controller 114 to be communicatively coupled to any of the various other system components described herein (e.g., the vehicle steering actuator 22, the location sensor 102, the implement steering actuator(s) 104, and/or the field topography sensor(s) 110). For instance, as shown in FIG. 4, a communicative link or interface 120 (e.g., a data bus) may be provided between the controller 114 and the components 22, 102, 104, 110 to allow the controller 114 to communicate with such components 22, 102, 104, 110 via any suitable communications protocol (e.g., CANBUS).

It should be appreciated that the controller 114 may correspond to an existing controller(s) of the implement 10 and/or the vehicle 12, itself, or the controller 114 may correspond to a separate processing device. For instance, in one embodiment, the controller 114 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 114 may be performed by a single processor-based device or may be distributed across any number of processor-based devices, in which instance such devices may be considered to form part of the controller 114. For instance, the functions of the controller 114 may be distributed across multiple application-specific controllers, such as a navigation controller, an engine controller, an implement controller, and/or the like.

Furthermore, in one embodiment, the system 100 may also include a user interface 122. More specifically, the user interface 122 may be configured to provide feedback (e.g., feedback or input associated with the topography of the field) to the operator of the implement/vehicle 10/12. As such, the user interface 122 may include one or more feedback devices (not shown), such as display screens, speakers, warning lights, and/or the like, which are configured to provide feedback from the controller 114 to the operator. The user interface 122 may, in turn, be communicatively coupled to the controller 114 via the communicative link 120 to permit the feedback to be transmitted from the controller 114 to the user interface 122. In addition, some embodiments of the user interface 122 may include one or more input devices (not shown), such as touchscreens, keypads, touchpads, knobs, buttons, sliders, switches, mice, microphones, and/or the like, which are configured to receive user inputs from the operator. In one embodiment, the user interface 122 may be mounted or otherwise positioned within a cab (not shown) of the vehicle 12. However, in alternative embodiments, the user interface 122 may mounted at any other suitable location.

In several embodiments, the controller 114 may be configured to identify one or more topographical features within the field across which the implement/vehicle 10/12 is traveling. As described above, the implement 10 and/or the vehicle 12 may include one or more field topography sensors 110, with each sensor 110 configured to capture data indicative of the topography of the portion of the field present within its field of view. In this regard, as the implement/vehicle 10/12 travel across the field, the controller 114 may be configured to receive the data from the field topography sensor(s) 110 (e.g., via the communicative link 120). Thereafter, the controller 114 may be configured to analyze or otherwise process the received field topography data to identify one or more topographical features within the field. For instance, the controller 114 may include a suitable algorithm(s) stored within its memory 118 that, when executed by the processor 116, allows the controller 114 to identify the topographical feature(s) present within the field. Moreover, in one embodiment, the controller 114 may be configured to continuously receive the data captured by the field topography sensor(s) 110 as the implement/vehicle 10/12 travels across the field. In such an embodiment, the controller 114 be configured to continuously identify the topographical feature(s) within the field as the implement/vehicle 10/12 move relative to such feature(s).

It should be appreciated that the controller 114 may be configured to identify any suitable type of topographical feature(s) present within the field across which the implement/vehicle 10/12 are traveling. For example, in one embodiment, the controller 114 may be configured to identify one or more seedbed ridges present within the field. In this regard, and as will be described below, the controller 114 may be configured to control the operation of the implement 10 and/or the vehicle 12 such that a predetermined positional relationship (e.g., a maximum lateral distance) between the furrow-forming tool(s) (e.g., the disc opener(s) 72) of the implement 10 and the seedbed ridge(s) is maintained. However, in alternative embodiments, the controller 114 may be configured to identify any other suitable topographical features present within the field, such as furrows, ditches, and/or the like.

Furthermore, the controller 114 may be configured to generate a field or swath map based on the identified topographical feature(s). More specifically, as the implement/vehicle 10/12 is moved across the field, the controller 114 may be configured to receive location data (e.g., coordinates) from the location sensor 102 (e.g., via the communicative link 120). Based on the known dimensional configuration and/or relative positioning between the field(s) of view of the field topography sensor(s) 110 and the location sensor 102, the controller 114 may be configured to geo-locate each topographical feature within the field. For example, in one embodiment, the coordinates derived from the location sensor 102 and the topography data received from the field topography sensor(s) 110 may each be time-stamped. In such an embodiment, the time-stamped data may allow the identified topographical feature(s) to be matched or correlated to a corresponding set of location coordinates received or derived from the location sensor 102. Thereafter, the controller 114 may be configured to generate a field or swath map (e.g., a graphical field map) illustrating identified topographical feature(s) at various positions within the field. For instance, the controller 114 may be configured to execute one or more algorithms stored within its memory 118 that generate the field map based on the identified topographical feature(s) and the data received from the location sensor 102. The location(s) of the topographical feature(s) within the generated field map may, in turn, be used to control the operation of agricultural equipment (e.g., sprayers, inter-seeders, side-dressers, and/or the like) during subsequent agricultural operations. For example, the controller 114 may be configured to generate a guidance line(s) on the field map for the agricultural equipment performing subsequent agricultural operations based on the location(s) of the topographical feature(s). Additionally, in one embodiment, the controller 118 may be configured to transmit instructions to the user interface 122 (e.g., the communicative link 120) instructing the user interface 122 to display the field map (e.g., a graphical field map).

Moreover, the controller 114 may be configured to update a previously-generated field map based on the identified topographical feature(s). More specifically, in certain instances, the location(s) of topographical feature(s) identified within a previously-generated field map may be inaccurate. For example, the positions of seedbed ridges or other topographical features within the field may vary from year to year due to new tillage operations and/or erosion. Moreover, drift associated with satellite navigation positioning systems may cause position(s) of the topographical feature(s) identified based on the field topography sensor(s) 110 (and any associated guidance lines) to differ from the position(s) of such feature(s) (and guidance lines) provided by the previously-captured field map. As such, the controller 114 may be configured to update or otherwise modify the location(s) of the topographical feature(s) (and any associated guidance line(s)) within the previously-generated field based on the current location of such feature(s).

In addition, the controller 114 may also be configured to determine the position of one or more furrow-forming tools (e.g., a disc opener(s) 72) of the implement 10 relative to the identified topographical feature(s). More specifically, after identifying the location of the topographical feature(s) within the field, the controller 114 may be configured to compare the position of the furrow-forming tool(s) relative to the identified topographical feature(s) within the field. Thereafter, the controller 114 may be configured to determine when the relative position between the furrow-forming tool(s) and the identified topographical feature(s) is offset from or falls outside of a predetermined positional relationship defined for the furrow-forming tool(s). Specifically, it may be desirable for the furrow-forming tool(s) to have a given positional relationship relative to the identified topographical feature(s) as the implement/vehicle 10/12 is traveling across the field, such as by maintaining the furrow-forming tool(s) within a given distance of the identified topographical feature(s). When the identified positional relationship between the furrow-forming tool(s) and the identified topographical feature(s) is offset from the predetermined positional relationship, the controller 114 may be configured to initiate one or more control actions to adjust the relative positioning of the furrow-forming tool(s).

In several embodiments, the predetermined positional relationship may be associated with a lateral distance defined between the furrow-forming tool(s) and the identified topographical feature(s) in the lateral direction 30 across the field (i.e., in a direction generally perpendicular to the direction of travel 14 of the implement 10). In such embodiments, the controller 114 may be configured to determine the lateral distance defined between the furrow-forming tool (s) and the identified topographical feature(s) based on the data received from the field topography sensor(s) 110 and compare such lateral distance to a predetermined minimum and/or maximum lateral distance associated with the pre-defined positional relationship defined for the furrow-forming tool(s). When the determined lateral distance exceeds the maximum predetermined lateral distance or falls below the minimum predetermined lateral distance, the controller 114 may be configured to initiate one or more control action(s) to adjust the position of the furrow-forming tool(s) relative to the topographical feature(s) within the field. Specifically, in one embodiment, the control action(s) may be configured to reduce the lateral distance between the furrow-forming tool(s) and the topographical feature(s) when the determined lateral distance exceeds the maximum predetermined lateral distance. Similarly, the control action(s) may be configured to increase the lateral distance between the furrow-forming tool(s) and the topographical feature(s) when the determined lateral distance falls below the minimum predetermined lateral distance. However, in alternative embodiments, the controller 114 may be configured to utilize any other suitable positional relationship defined between the furrow-forming tool(s) and the identified topographical feature(s) within the field to assess when a suitable control action(s) should be initiated to adjust the relative positioning of the furrow-forming tool(s).

Figure 6:
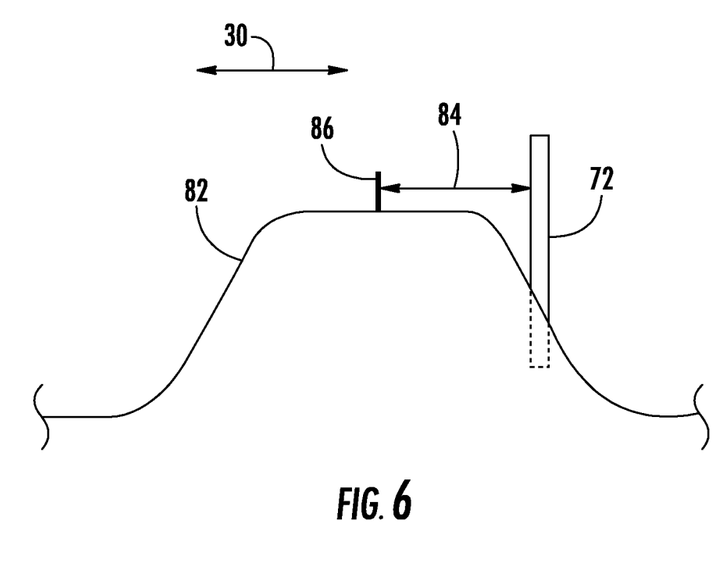
FIG. 6 illustrates a diagrammatic view of the relative positioning of a furrow-forming tool of a seed-planting implement and a topographical feature present within the field in accordance with aspects of the present subject matter, particularly illustrating a lateral distance defined between the furrow-forming tool and the topographical feature.

Referring now to FIG. 6, in several embodiments, the topographical features(s) may correspond to one or more seedbed ridges. As indicated above, in certain instances (e.g., when planting crops in a ridge planting scheme), it may be desirable for the furrow-forming tool(s) (e.g., the disc opener(s) 72) to be laterally aligned with the seedbed ridge(s) such that each furrow is generally formed at or adjacent to the lateral center of one of the seedbed ridges. In such instances, the controller 114 may be configured to control the operation of the implement 10 and/or vehicle 12 to maintain the desired lateral alignment between the furrow-forming tool(s) and the seedbed ridge(s). For example, as shown in FIG. 5, in one embodiment, the controller 114 may be configured to identify a seedbed ridge 82 within the field based the data received from the field topography sensor(s) 110. The controller 114 may then be configured to determine a lateral distance (e.g., as indicated by arrow 84 in FIG. 5) between one of the disc opener(s) 72 and a lateral center (e.g., as indicated by line 86 in FIG. 5) of the identified seedbed ridge 82. Thereafter, the controller 114 may be configured to compare the determined lateral distance 84 to a maximum lateral distance associated with the predetermined position relationship defined between the disc opener 72 and the seedbed ridge 82. When the determined lateral distance 84 exceeds the predetermined maximum lateral distance (e.g., indicating that the disc opener 72 is too far away from the seedbed ridge 82), the controller 114 may be configured to initiate one or more control actions to reduce the lateral distance 84 between the disc opener 72 and the seedbed ridge 82.

Referring again to FIG. 5, as indicated above, the controller 114 may be configured to initiate one or more control action(s) to adjust the position of the furrow-forming tool(s) of the implement 10 relative to the identified topographical feature(s) within the field. Specifically, in several embodiments, the controller 114 may be configured to control the operation of the implement 10 and/or the vehicle 12 to adjust the relative positioning between the furrow-forming tool(s) and the topographical feature(s), such as by adjusting of the orientation or direction of travel 14 of the implement 10. As such, the controller 114 may be configured to transmit instructions to the vehicle steering actuator 22 and/or the implement steering actuator(s) 104 (e.g., via the communicative link 120) instructing the actuator 22 and/or the actuator(s) 104 to adjust their operation. For example, the controller 114 may instruct the vehicle steering actuator 22 to adjust the direction of travel 14 of the implement 10 (and the vehicle 12) to adjust the relative position between the furrow-forming tool(s) and the topographical feature(s). Moreover, the controller 114 may instruct the implement steering actuator(s) 104 to adjust the direction of travel 14 of the implement 10 (e.g., relative to the vehicle 12) to adjust the relative positioning between the furrow-forming tool(s) and the topographical feature(s). However, in alternative embodiments, the controller 114 may be configured to initiate any other suitable control action(s) configured to adjust the position of the furrow-forming tool(s) relative to one or more topographical features within the field.

Figure 7:
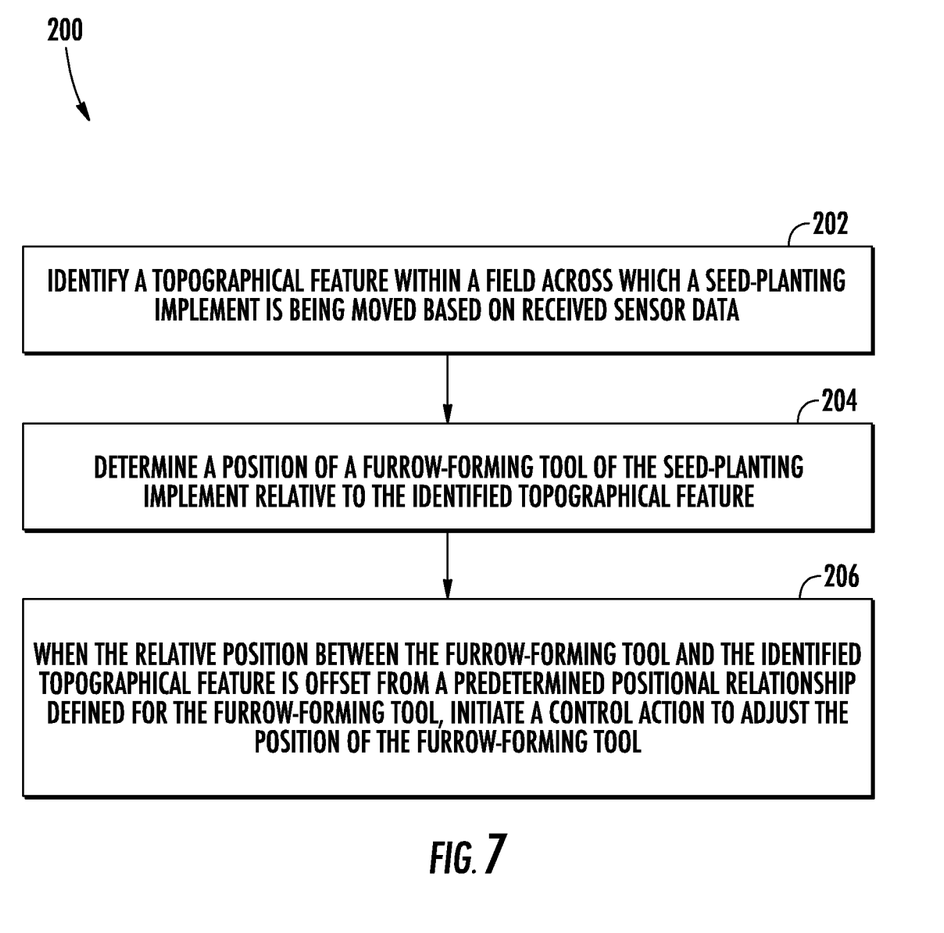
FIG. 7 illustrates a flow diagram of one embodiment of a method for controlling the operation of a seed-planting implement in accordance with aspects of the present subject matter.

Referring now to FIG. 7, a flow diagram of one embodiment of a method 200 for controlling the operation of a seed-planting implement is illustrated in accordance with aspects of the present subject matter. In general, the method 200 will be described herein with reference to the seed-planting implement 10, the work vehicle 12, and the system 100 described above with reference to FIGS. 1-6. However, it should be appreciated by those of ordinary skill in the art that the disclosed method 200 may generally be implemented with any seed-planting implement having any suitable implement configuration, any work vehicle having any suitable vehicle configuration, and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include identifying, with one or more computing devices, a topographical feature within a field across which a seed-planting implement is being moved based on received sensor data. For instance, as described above, the controller 114 may be configured to identify one or more topographical features (e.g., a seedbed ridge(s)) within a field across which a seed-planting implement 10 is being moved based on data received from one or more field topography sensors 110.

Additionally, at (204), the method 200 may include determining, with the one or more computing devices, a position of a furrow-forming tool of the agricultural implement relative to the identified topographical feature. For instance, as described above, the controller 114 may be configured to determine the position(s) of a furrow-forming tool(s) (e.g., a disc opener(s) 72) of the seed-planting implement 10 relative to the identified topographical feature(s).

Moreover, as shown in FIG. 7, at (206), when the relative position between the furrow-forming tool and the identified topographical feature is offset from a predetermined positional relationship defined for the furrow-forming tool, the method 200 may include initiating, with the one or more computing devices, a control action to adjust the position of the furrow-forming tool. For instance, as described above, the controller 114 may be configured to compare the relative positioning of the furrow-forming tool(s) and the identified topographical feature(s) to a predetermined positional relationship that is associated with a desired position or positional relationship between the furrow-forming tool(s) and the identified features(s). When the relative positioning of the furrow-forming tool(s) is offset from the predetermined positional relationship, the controller 114 may be configured to initiate one or more suitable control actions to adjust the position of the furrow-forming tool(s) relative to the identified feature(s), such as by controlling the operation of a vehicle steering actuator 22 and/or an implement steering actuator(s) 104 to adjust the orientation or direction of travel 14 of the implement 10.

It is to be understood that the steps of the method 200 are performed by the controller 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 114 described herein, such as the method 200, is implemented in software code or instructions which are tangibly stored on a tangible computer readable medium. The controller 114 loads the software code or instructions via a direct interface with the computer readable medium or via a wired and/or wireless network. Upon loading and executing such software code or instructions by the controller 114, the controller 114 may perform any of the functionality of the controller 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of a seed-planting implement, the system comprising:
    a furrow-forming tool configured to form a furrow in soil present within a field across which the seed-planting implement is being moved;
    a sensor configured to capture data indicative of a topographical profile of the soil within the field; and
    a controller communicatively coupled to the sensor, the controller configured to:
        identify a seedbed ridge within the field based on the data received from the sensor;
        determine a position of the furrow-forming tool relative to the identified seedbed ridge; and
        initiate a control action to adjust the position of the furrow-forming tool when it is determined that the relative position between the furrow-forming tool and the identified seedbed ridge is offset from a predetermined positional relationship defined for the furrow-forming tool.

2. The system of claim 1, wherein the predetermined positional relationship is associated with a lateral distance defined between the furrow-forming tool and the identified seedbed ridge in a lateral direction extending perpendicular to a direction of travel of the seed-planting implement across the field.

3. The system of claim 1, wherein the control action comprises adjusting an orientation of the seed-planting implement across the field.

4. The system of claim 3, wherein the control action comprises controlling the operation of a work vehicle to which the seed-planting implement is coupled to adjust the orientation of the seed-planting implement.

5. The system of claim 3, wherein the control action comprises controlling the operation of the seed-planting implement to adjust the orientation of the seed-planting implement.

6. The system of claim 1, wherein the controller is further configured to generate a field map based on the identified seedbed ridge.

7. The system of claim 1, wherein the controller is further configured to update a previously-generated field map based on the identified seedbed ridge.

8. The system of claim 1, wherein the sensor is positioned on a seed-planting implement such that the sensor has a field of view directed toward a location in front of the furrow-forming tool.

9. The system of claim 1, wherein the sensor comprises at least one of a LIDAR sensor or a camera.

10. A method for controlling the operation of a seed-planting implement, the seed-planting implement including a furrow-forming tool configured to form a furrow in soil present within a field across which the seed-planting implement is being moved, the method comprising:
    identifying, with one or more computing devices, a seedbed ridge within the field based on received sensor data;
    determining, with the one or more computing devices, a position of the furrow-forming tool relative to the identified seedbed ridge; and
    when the relative position between the furrow-forming tool and the identified seedbed ridge is offset from a predetermined positional relationship defined for the furrow-forming tool, initiating, with the one or more computing devices, a control action to adjust the position of the furrow-forming tool.

11. The method of claim 10, wherein the predetermined positional relationship is associated with a lateral distance defined between the furrow-forming tool and the identified seedbed ridge in a lateral direction extending perpendicular to a direction of travel of the seed-planting implement across the field.

12. The method of claim 10, wherein the control action comprises adjusting an orientation of the seed-planting implement across the field.

13. The method of claim 12, wherein the control action comprises controlling the operation of a work vehicle to which the seed-planting implement is coupled to adjust the orientation of the seed-planting implement.

14. The method of claim 12, wherein the control action comprises controlling the operation of the seed-planting implement to adjust the orientation of the seed-planting implement.

15. The method of claim 10, further comprising:
    generating, with the one or more computing devices, a field map associated with a projected travel path for the seed-planting implement based on the identified seedbed ridge.

16. The method of claim 10, further comprising:
    updating, with the one or more computing devices, a previously-generated field map associated with a projected travel path for the seed-planting implement based on the identified seedbed ridge.

* * * * *